United States Patent [19]

Friesen

[11] Patent Number: 5,006,135
[45] Date of Patent: Apr. 9, 1991

[54] SELF CLEANING SCREEN

[76] Inventor: David Friesen, 305-1825-4th St. N., Cranbrook, British Columbia, Canada, V1C 3L9

[21] Appl. No.: 448,124

[22] Filed: Dec. 12, 1989

[51] Int. Cl.⁵ .............................................. B01D 46/04
[52] U.S. Cl. ....................................... 55/286; 55/301; 55/290; 55/293
[58] Field of Search ................ 55/283, 284, 286, 287, 55/290, 294, 301, 293

[56] References Cited

U.S. PATENT DOCUMENTS

| | | | |
|---|---|---|---|
| 258,876 | 6/1882 | Bean | 55/285 |
| 3,816,981 | 6/1974 | Carnewal et al. | 55/290 |

Primary Examiner—Bernard Nozick
Attorney, Agent, or Firm—Adrian D. Battison; Stanley G. Ade; Murray E. Thrift

[57] ABSTRACT

A self cleaning screen particularly for an engine cooling system comprises a housing having a screen front wall and a rear wall in which there is provided a circular opening. The housing is divided by divider plates connecting between the front and rear walls and extending outwardly from the circular opening to outer side edges of the housing. A baffle is mounted at the center of the opening and is rotatable by a fin or an electric motor. The baffle includes a triangular front plate for closing off a part of the screen aligned with the opening together with a side plate portion which closes off the area defined between the divider plates. As the baffle rotates therefore a portion of the screen extending radially from the centre of the opening to the side edge is closed off so that air does not flow through that area allowing filter debris to fall from the screen.

8 Claims, 1 Drawing Sheet

SELF CLEANING SCREEN

BACKGROUND OF THE INVENTION

This invention relates to a self cleaning screen for use with an air flow which is particularly but not exclusively designed for use with an engine cooling system.

Radiator type cooling systems of internal combustion engines used for example in an agricultural environment often require a screen upstream of the radiator so that air drawn through the radiator is filtered to extract dust and other particles in the air. In the agricultural environment the air drawn into the radiator carries dust, soil particles, plant materials such as chaff and other debris which must be separated to prevent clogging of the radiator with this material. Various proposals have previously been put forward for screen designs and it is of course essential that the screen be effectively self cleaning since the screen itself would otherwise become quickly clogged and valueless.

In order to reduce air flow velocity through the screen to enable easier cleaning of the screen, it is often desirable to have a large screen which is significantly larger than the air intake.

However, this causes difficulty in providing a necessary moving element which allows the portions of the screen to be cleaned on a regular basis.

It is one object of the present invention therefore, to provide an improved design of screen which enables the screen to be manufactured to any required shape while allowing that screen shape to be simply and readily cleaned.

According to the invention, therefore, there is provided a self cleaning screen for separating particles from an air stream comprising a housing defining a front surface which is covered by a filter screen having perforations sized to halt the particles while allowing the air stream to pass through, a rear surface spaced from the front surface and a surrounding side wall means extending between the front surface and the rear surface to cause all airflow exiting the rear surface to be drawn through the front surface and the screen, a plurality of divider plates each extending from a front edge of the plate at the screen in a rearward direction to a rear edge of the plate at said rear surface of the housing, said divider plates being spaced each from the next so as to divide the screen into plurality of separate screen elements, the air flow through the screen element being confined on respective sides by said divider plates, the rear surface of the housing having at least a portion thereof which is open to allow passage of the air through the screen and between the plates, and baffle means for halting flow of air through each one of said separate screen elements in turn to allow material collecting on said each element in turn to be discharged from the screen.

Preferably the housing includes a back plate which has an opening smaller than the screen. A portion of the baffle within the smaller opening can then cooperate with the divider plates which direct the air toward the opening to close off the separate air channels defined by the divider plates in turn.

This allows for example, a simple rotating vein type arrangement mounted in a circular opening in the back plate to control cleaning of a much larger screen of any desired shape for example, rectangular.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

The self cleaning screen comprises a housing defined by a flat back plate 10 and four upstanding side walls 11, 12, 13 and 14 arranged at right angles to define a rectangular box. In one example, the back plate and the side walls are formed of metal welded to form a rigid box structure. However other materials such as molded PVC are possible. The front surface of the housing is defined by a sheet 15 of a filter screen material which is attached to the side walls 11, 12, 13, 14 by a suitable fastening (not shown). The screen thus covers the whole of the front of the housing so that any air entering the housing must pass through the screen to carry out a filtering action.

The size of the perforations of the screen are chosen in accordance with the requirements and in one example the screen can comprise a simple mesh screen suitable for extracting dust, chaff and soil particles which will otherwise clog the radiator of the cooling system in an internal combustion engine. The size of the housing can be selected in accordance with the size of the inlet area available and can be flat as shown or can be curved as necessary to follow the curvature of the vehicle to which it is intended to be attached.

The back plate 10 has an opening 16 in the form of a circular hole simply cut into the back plate at a suitable location on the back plate. The hole defines the outlet for air entering the housing with the hole being suitably located on the housing to direct the air onto the equipment with which the filter screen is associated. In the example shown the hole is offset slightly to one side. This position can be modified in accordance with the design requirements of the vehicle concerned.

The size of the hole can also vary but is preferably significantly smaller than the size of the back plate. The relative dimensions of the hole on the back plate are preferably coordinated with the proportion of opening of the screen material and in many cases this approximates to fifty percent of the screen material so that an opening which is fifty percent of the back plate is desired. However, it will be appreciated that a larger back plate relative to the size of the opening 16 will reduce the velocity of air flow through the screen.

Figure 3:
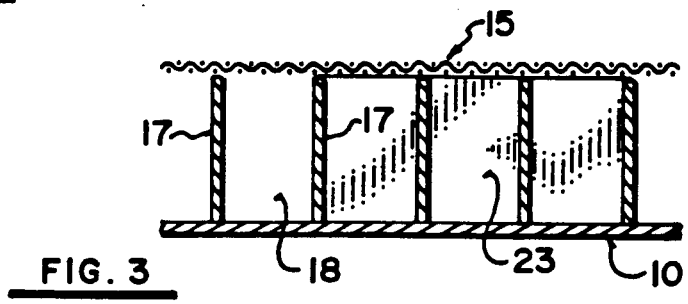
FIG. 3 is a cross sectional view along the lines 3—3 of FIG. 1.

From the opening a plurality of divider plates 17 are provided which extend from the opening to the side walls. The divider plates as best shown in FIG. 3 have a front edge in contact with the screen 15 and a rear edge in contact with or welded to the back plate 10.

This acts to define the screen into separate screen elements with the air which passes through that screen element passing through the channel defined by the divider plates toward the opening and through a rectangular area 18 bounded by the divider plates on the respective sides and the screen and the back plate at the front and rear respectively.

Figure 1:
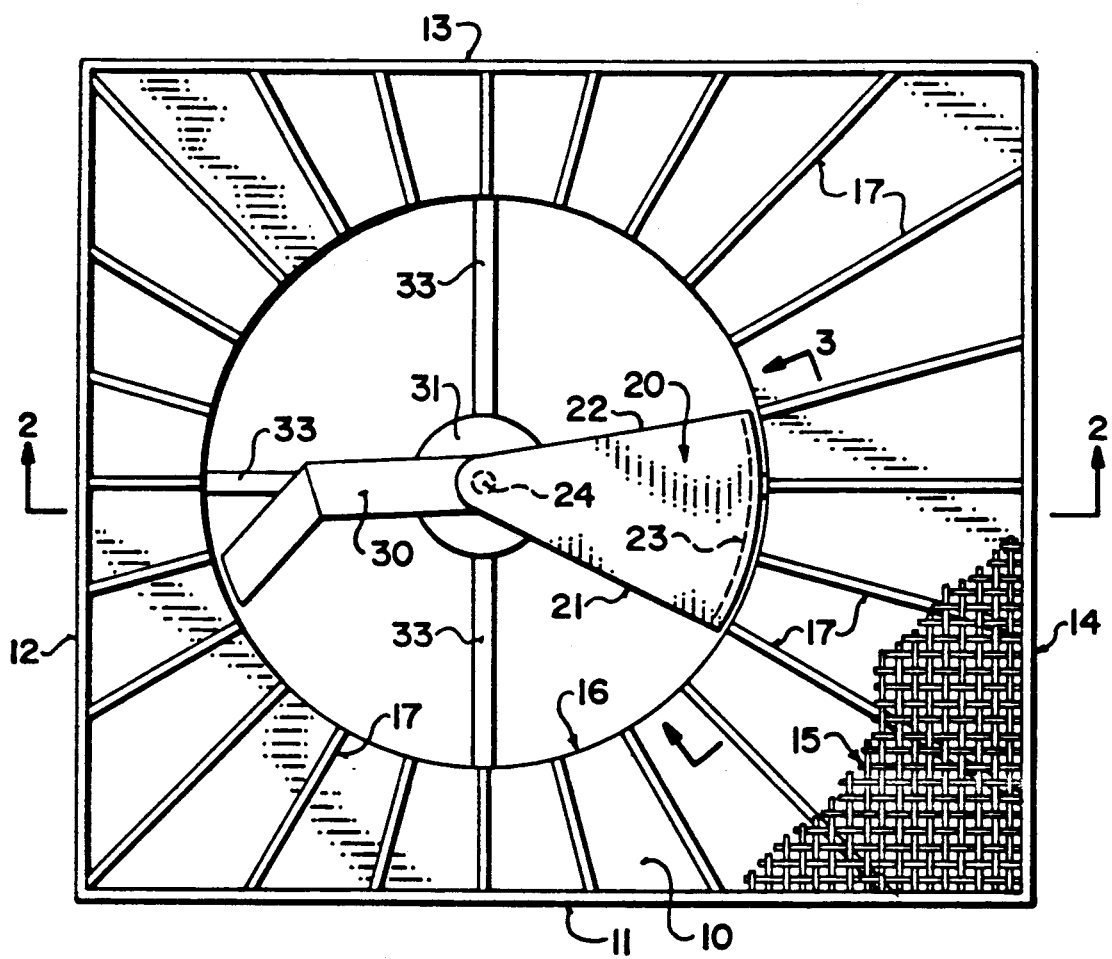
FIG. 1 is a front elevational view of a self cleaning screen according to the present invention with the majority of the front filter screen material removed to show the interior operating parts.
Figure 2:
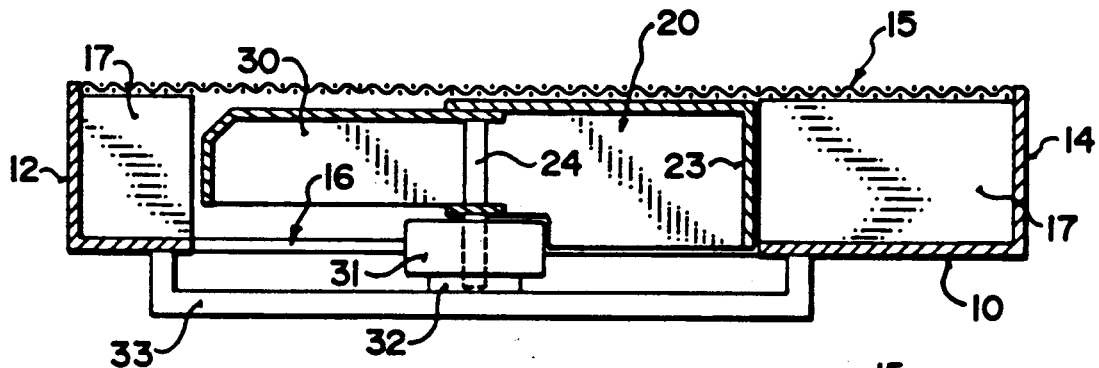
FIG. 2 is a cross sectional view along the lines 2—2 of FIG. 1.

A baffle member indicated at 20 is shaped in plan view as a sector of the circle defined by the opening 16. Sides 21 and 22 of the sector are arranged to be spaced by the same angular distance as four of the divider plates 17. The baffle further includes a surface 23 lying at right angles to the upper surface in the shape of the sector so that the surface 23 is curved about the centre of the circular opening 16. The baffle is rotatable about the centre of the circle on an axle 24. As the baffle rotates, the wall 23 of the baffle passes closely adjacent the inner edges of the divider plates 17 at the periphery of the opening 16. The front surface of the baffle lies closely adjacent to or in contact with the rear surface of the screen 15 so that it prevents air from flowing directly through that portion of the screen which is shaped in the sector of the circle defined by the front surface of the baffle. The side wall 23 of the baffle as shown in FIG. 1 covers three of the air flow passages defined between the divider plates 17 so that in that position the baffle halts flow of air through the screen into the air flow passage and along the passage way to the opening 16. This position is best shown in FIG. 3 where the face 23 of the baffle is visible through three of the air passage ducts while the fourth air passage duct is open to allow passing through the screen element associated with that passage duct to pass toward the opening 16 and through the opening 16.

Thus as the baffle rotates, it halts air flow through one portion of the screen so while the air flow is halted through that portion, any material collecting on the outside surface of the screen can fall from that portion to be discharged since the suction acting to hold the material against the screen is removed as the air flow is halted.

The drive force for rotating the baffle is provided firstly by a fin 30 which is shaped so that air passing through the opening provides a rotational force onto the fin and thus on the baffle which is connected to the fin. The shape of the fin is shown only schematically since this will be apparent to one skilled in the art and can be modified in accordance with requirements. In addition the force controlling the rotation is provided by an electromagnetic control device indicated at 31. The control device can either provide a rotational force or it can be controlled to provide repeated halting forces at spaced positions around the axle. Thus a plurality of magnets can be provided around the axle which are actuated sequentially temporarily halting the baffle at each space location around the periphery. This ensures a rotation rate of the baffle of the order of one to five rpm which gives a period during which the air stream is halted which is sufficient to allow the collected material to fall from the screen. The control device 31 is mounted upon a bearing 32 carrying the axle 24 with the bearing being supported upon a spider assembly 33.

In an alternative arrangement (not shown), the opening can be rectangular with the divider plates extending transversely across the screen from one side to the other side. In this case the baffle can be formed as a strip across the rectangular opening movable in a vertical direction so as to gradually move from the top of the opening to the bottom of the opening. In addition the baffle has side pieces corresponding to the surfaces 23 which cooperate with the divider plates to halt air flow moving across the screen between the divider plates.

In a yet further alternative arrangements (not shown) each air passage between two divider plates is associated with a pivotal louvre arrangement which can be moved from an open position in which the air is allowed to flow through the screen element associated with those divider plates to a closed position in which the air flow is closed off through that screen element to allow material collected to be discharged. Each louvre element in turn is therefore operated to be moved to the closed position and then reopened.

Since various modifications can be made in my invention as hereinabove described, and many apparently widely different embodiments of same made within the spirit and scope of the claims without departing from such spirit and scope it is intended that all matter contained in the accompanying specification shall be interpreted as illustrative only and not in a limiting sense.

I claim:

1. A self cleaning screen for separating particles from an air stream comprising a housing defining a front surface which is covered by a filter screen having perforations sized to halt the particles while allowing the air stream to pass through, a rear surface spaced from the front surface and a surrounding side wall means extending between the front surface and the rear surface to cause all airflow exiting the rear surface to be drawn through the front surface and the screen, a plurality of divider plates each extending from a front edge of the plate at the screen in a rearward direction to a rear edge of the plate at said rear surface of the housing, said divider plates being spaced each from the next so as to divide the screen into plurality of separate screen elements, the air flow through the screen element being confined on respective sides by said divider plates, the rear surface of the housing having at least a portion thereof which is open to allow passage of the air through the screen and between the plates, and baffle means for halting flow of air through each one of said separate screen elements in turn to allow material collecting on said each element in turn to be discharged from the screen.

2. A screen according to claim 1 wherein the housing includes a back plate at said rear surface which has an opening therein which is smaller than the screen, the divider plates being arranged to extend in a longitudinal direction of the plate from the opening to said side wall means and in a transverse direction of the plate from the screen to said back plate to confine air passing through the screen into separate air paths moving from the screen toward said opening, said baffle means being arranged to close off each said separate air path in turn.

3. A screen according to claim 2 wherein each of the divider plates terminates at an edge thereof at an outer peripheral surface of the opening so that a portion of the screen directly facing the opening is free from divider plates, and wherein the baffle means includes a first surface for closing off air flow through a portion of said portion of the screen and a second surface for closing off at least one of said separate air paths.

4. A screen according to claim 3 wherein the first surface of the baffle means is substantially flat and substantially lies in contact with the screen and wherein the second surface extends substantially at right angles to the first surface so as to cooperate with said edges of the divider plates.

5. A screen according to claim 3 wherein the second surface of the baffle means is dimensioned to cover a plurality of said separate paths.

6. A screen according to claim 2 wherein the opening in the back plate is circular and wherein the divider plates extend substantially radially relative to a centre of the circle, said baffle means being mounted for rotation about an axis at the centre of the circle.

7. A screen according to claim 6 wherein the baffle means carries a fin cooperable with the air stream passing through the screen to generate a rotational force on the baffle means.

8. A screen according to claim 7 including electromagnetic control means arranged to provide a controlling force on the rotation of the baffle such that the baffle can rotate at a predetermined speed of the order of one to five rpm independent of the magnitude of the air flow.

* * * * *